United States Patent Office 2,815,085
Patented Dec. 3, 1957

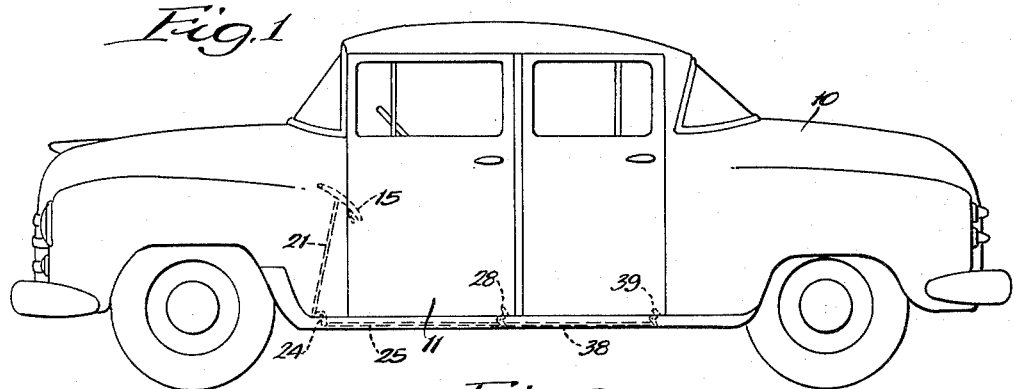
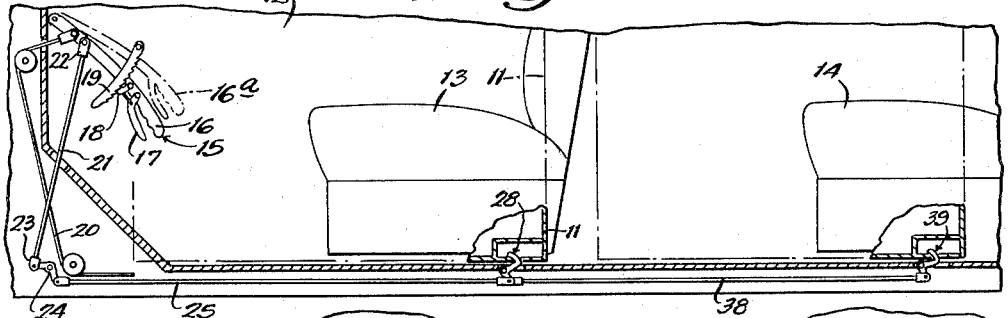
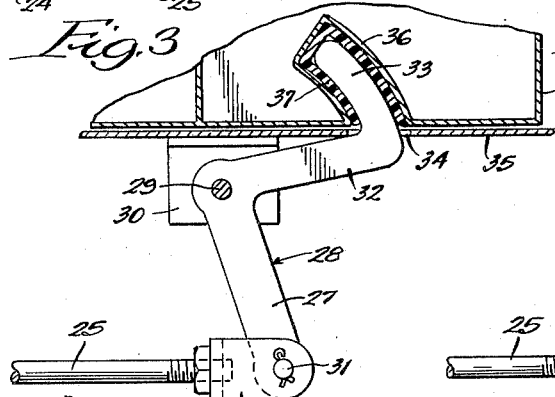 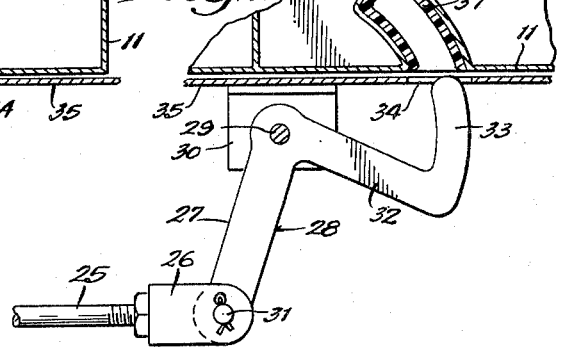

2,815,085

VEHICLE DOOR SAFETY LOCK

Edson L. Whipple, Phoenix, Ariz.

Application October 22, 1954, Serial No. 463,857

2 Claims. (Cl. 180—82)

This invention relates to a safety device, and has particular utility in combination with vehicles having doors, for locking the doors thereof in closed position.

Improvements in automobiles and the tendency toward power and high speed has made impact accidents—collisions, for example—quite serious. It has been found that when automobiles traveling at a high speed impact either a moving or stationary object, that the impact forces frequently cause the automobile doors to swing open. Perhaps this is caused by some distortion or spring of the vehicle frame or body. In any event, when the doors do swing open on impact, there is considerable likelihood that one or more of the occupants of the vehicle may be thrown therefrom.

Statistics compiled by the Automobile Manufacturers Association and the National Safety Council establish that fatalities are especially high among occupants of automobiles that are thrown therefrom in a collision. It has been estimated that if the occupants of an automobile could be confined thereto during impact that fatalities might be reduced by more than 70%. It is apparent then that the provision of some means for preventing automobile doors from being sprung open upon impact would be a desirable achievement.

It is, accordingly, an object of this invention to provide means effective to lock the doors of an automobile or other vehicle in closed position even against the forces tending to throw the doors open that accompany a serious collision. Still another object is to provide simple and inexpensive means for locking the doors of an automobile in closed position while the automobile is in motion, the means being operative to maintain the doors in closed position even through impact of the automobile. Yet another object is in the provision of a locking device that is operative in conjunction with a vehicle door and the frame therefor to lock the door in closed position and to provide ready means for actuating the locking device.

A further object is in providing a locking device of the character described that can be swung upwardly from a concealed position within the frame of an automobile door and into a suitable receiver carried by the door—the locking device and receiver being so arranged that minimum frictional resistance is provided to the withdrawal of the locking device, so that it may be readily released even though the door or frame therefor be sprung as a result of an impact or collision. Yet a further object is to provide a safety lock arrangement as described in which the locking device is arranged for actuation by the braking system of an automobile whereby the device is automatically locked during impact. Additional objects and advantages will appear as the specification proceeds.

Illustrative embodiments of the invention are shown in the accompanying drawing, in which—

Figure 1 is a side view in elevation of an automobile incorporating the invention;

Figure 2 is an enlarged broken longitudinal sectional view showing the details of one form of the invention;

Figure 3 is a greatly enlarged broken sectional view showing the locking device in its actuated position;

Figure 4 is a view similar to Figure 3, but showing the device in released position; and Figure 5 is a broken longitudinal sectional view of an automobile showing a modified form of the invention.

Illustrated in Figure 1 is a typical automobile 10 having one or more doors 11 arranged to provide closures for the access openings permitting occupants to enter and leave the compartment 12 of the automobile. In the specific illustration, the automobile 10 is a 4-door sedan, and is equipped then with two doors on each side thereof. The compartment 12 is provided with front and rear seats 13 and 14 respectively that are adapted to receive occupants thereon in the conventional manner. It should be appreciated that the automobile 10 is illustrative only, and that the invention applies equally to vehicles of substantially all makes and models, and similarly applies to vehicles other than automobiles, such as trucks, trailers, etc.

The automobile 10 is equipped with a hand brake or parking brake assembly designated generally with the numeral 15. The brake 15 may be substantially conventional and operate in the well-known manner to prevent movement of the automobile when it is stopped, and when the brake is moved to the parking position. Since the details of parking or hand brakes are well known, they will not be described further. The brake assembly 15 includes the brake arm 16 that is pivotally mounted adjacent an end thereof for swinging movement between the position shown by full lines and the position shown by broken lines in Figure 2, and that is designated with the numeral 16a. The arm 16 carries a pivotally mounted lever 17 adapted to be gripped for releasing the pawl 18 from the teeth of the rack 19. As is well known, the brake arm or lever 16 can be moved progressively from a completely released position to a full lock position, and can be maintained at any point therebetween by means of the pawl and teeth engaged thereby. A cable 20 connected to the arm 16 is adapted to energize the braking system when the arm is swung toward the position shown at 16a.

Pivotally connected to the arm 16 intermediate the ends thereof is a rod 21 equipped at its upper end with a bifurcated connector member 22 provided for that purpose. At its lower end, the rod 21 has a bifurcated end portion 23 pivotally connected to one arm of a bell crank 24, having the other end thereof pivotally secured to a shaft or draw rod 25. The bell crank 24 will be pivotally carried by the frame or body of the automobile 10.

Referring now to Figure 3 in particular, it is seen that the rear end portion of the draw rod 25 may be threaded for adjustably receiving thereon the nut-equipped connector member 26 that is bifurcated and provides spaced legs receiving therebetween the arm 27 of a bell crank 28, that is pivoted about the axis 29 provided by a frame portion 30 of the automobile. A pin 31 extending through the connector member 26 and the arm 27 provides a pivotal connection between the connector and the arm. If desired, the pin 31 may be enlarged at one end, and provided at its other end with an opening therethrough adapted to receive a cotter pin. The bell crank 28 also provides an arm 32 that is turned upwardly at its free end and provides a locking finger 33. The finger 33 may be slightly arcuate, as in the drawing, and is adapted to move through an opening or aperture 34 provided in the floor or door frame 35 of the automobile.

The door 11 is provided interiorly thereof with a sheath 36 that is slightly arcuate, and that is adapted to receive the pawl or locking finger 33 therein. Preferably, the sheath 36 is lined interiorly with a liner 37 formed of some material that will offer a low frictional resistance to the movement of the finger 33 into and out of the sheath 36. Any material may be employed that will accomplish that purpose and, for example, nylon has been found suitable. Other durable plastics having a low coefficient of friction, such as polyethylene, may be used. Most desirably, the internal dimensions of the liner 37 are such that the locking finger 33 is snugly received therein, though free to move relative thereto.

If the automobile is equipped with more than one door, as is shown in the drawing, it will be desirable to provide an additional shaft or draw rod 38, that at one end is connected to the bell crank 28 and at its other end is connected to a bell crank 39, that may be identical with the crank 28 and is arranged to provide a locking engagement with the rear door of the automobile which is equipped with a sheath, etc. as has been described. It should be appreciated that an identical structural arrangement may be provided for the opposite side of the automobile, and can be connected to the hand brake assembly 15 in the manner already described.

When the vehicle is stopped, the arm 16 will be drawn upwardly and into the position 16a. This movement will be operative in the usual manner to actuate the braking system of the automobile that is associated with the brake assembly 15. At the same time, that movement of the arm 16 will pull the rod 21 upwardly—and that movement in turn will pivot the bell crank 24 so as to draw the rods 25 and 38 forwardly. The forward movement of the draw rods will swing the locking fingers 33 of the bell cranks or locking devices downwardly, and thereby withdraw them from the sheaths 36 and into a concealed position below the floor or door frame 35. The doors 11 are then free to be opened, and may be opened or closed in a conventional manner.

On the other hand, when it is desired to operate the automobile, the lever 16 will be swung downwardly and into the position shown by full lines in Figure 2. That movement will push the rod 21 downwardly and through the bell crank 24; the draw rods 24 and 38 will be pushed rearwardly. As a result, the locking devices 28 and 39 will be swung about their pivotal axes to insert the locking fingers 33 into the sheaths 36. Consequently, the doors of the vehicle will be locked in closed position, and will be maintained in that locked position until the hand brake is again moved to the park or brake position.

A modified form of the invention is illustrated in Figure 5. In this form of the invention, the automobile 10 is equipped with doors 11, each having a sheath 36 therein. Similarly, the floor or door frame portion 35 of the automobile is equipped with openings therethrough adapted to receive the locking fingers 40 of the bell cranks or locking devices 41 and 42. The forward crank 41 is pivotally connected to a plunger 43 of an hydraulic cylinder 44 that communicates through a conduit 45 with a distributing head 46. The distributing head 46 in turn communicates through a conduit 47 with a power cylinder 48 having a plunger 49 connected to a crank arm 50 with which the brake arm 51 is provided. The upper end of the brake arm 51, which is pivoted intermediate the ends thereof about an axis 52, is turned laterally and inwardly and projects through the inclined floor portion 53 of the automobile, and is equipped at its inner end with a foot pedal 54. The brake arm 51 is also pivotally connected to the plunger 55 of an hydraulic brake cylinder 56 adapted to communicate with the individual brake cylinders mounted at the wheels of the automobile. The braking system of the vehicle may be completely conventional, and is energized when the foot brake is depressed.

It is clear from Figure 5 that the distributing head 46 is provided with a plurality of conduits that will be connected to hydraulic cylinders 44 associated with the locking devices for each of the doors of the automobile.

In normal operation, the foot brake pedal is released and is in the position shown in Figure 5. At such time, the locking devices 41 and 42 are in the retracted position shown in Figure 5, and the doors of the automobile are free to be opened and closed in the conventional manner. When the foot pedal is depressed, the plunger 49 is moved inwardly and fluid is forced through the conduit 47 and into the distributing head 46. From the distributing head 46, it is forced into the individual door cylinders 44 with the result that the plungers 43 thereof are forced outwardly, and the locking devices 41 and 42 swung about their pivotal axes to project the locking fingers 40 thereof through the floor of the automobile and into the sheaths 36 carried by the individual doors. Therefore, during the period when the brake pedal is depressed, the locking devices are actuated and are in interlocking engagement with the doors of the automobile. The locking devices are released immediately upon release of the brake pedal, and springs 57 may be used to provide a restoring force to insure such release.

In the first form of the invention described, it is clear that the safety lock is actuated when the parking brake is released, and the locking devices then are in interlocking engagement with the doors of the automobile and are effective to prevent inadvertent opening thereof. The lock is established between the frame of the automobile or the floor or door frame, both of which are rigidly secured to the main frame of the automobile and the doors. Thus, the safety lock is effective to prevent opening of the doors even though the automobile may be subjected to severe impact such as might result if an automobile traveling at high speed collides with a moving vehicle, or even with a stationary object. It is appreciated that impact of considerable magnitude may have a tendency to destroy the alignment between the movable doors and the door frames, etc. with the result that binding may occur between the locking fingers 33 and the doors into which they are inserted. The provision of the low resistance liner, however, permits the locking fingers to be withdrawn even though perfect alignment between the liners and the locking fingers is destroyed. After impact then, it is easy to release the locking devices by simply drawing the arm 16 of the parking brake to the park position, and it is apparent that through the lever arrangement illustrated that a considerable mechanical advantage is provided between the arm 16 and the locking devices for the doors.

In the form of the invention shown in Figure 5, the locking devices are in the locked position only when the foot pedal is depressed. It is believed that generally the foot brake of an automobile will be depressed by the driver shortly prior to and through a collision. Thus, at the precise moment when it is desired to have the doors locked so that the occupants cannot be thrown from the automobile, the locking devices insure this result by rigidly holding the doors in closed position.

While in the foregoing specification, embodiments of the invention have been set out in considerable detail for purposes of illustration, it will be apparent to those skilled in the art that numerous changes may be made in those details without departing from the spirit and principles of the invention.

I claim:

1. In an automobile having a door frame providing access opening to the passenger compartment and having at least one door swingable into closed position within said frame, a locking device pivotally carried by said automobile and having a locking finger movable between a locked position and a retracted position, said frame being provided with an opening therethrough aligned with said locking finger, said door being provided with a sheath aligned with said opening and being adapted to receive said locking finger therein when said finger is moved into locked position, said sheath having a liner being frictionally engageable with said finger when said finger is in locked position, a foot brake pedal provided by said automobile, and a hydraulic pressure system operatively arranged with said locking device and with said foot pedal for moving said locking finger into locked position when the foot pedal is depressed and for moving said finger into retracted position when said pedal is released.

2. In combination with an automobile having a door frame and a door swingable between an open position and a closed position within said frame, a locking finger carried by said frame and being movable between an unlocked position and a locking position, said door being provided interiorly thereof with a sheath adapted to receive said finger therein when said finger is moved to locking position, said sheath being equipped with a liner providing low frictional resistance to the movement of said locking finger into and out of said sheath, a foot brake pedal movably carried by said automobile within the interior thereof, and hydraulic means cooperating with said foot pedal and said finger for moving said finger into locking position when said pedal is depressed.

References Cited in the file of this patent

UNITED STATES PATENTS

| | | |
|---|---|---|
| 1,580,722 | Greathouse | Apr. 13, 1926 |
| 1,906,699 | Mallison et al. | May 2, 1933 |
| 2,254,419 | Castle | Sept. 2, 1941 |
| 2,472,915 | Miller | June 14, 1949 |
| 2,647,789 | Chayne | Aug. 4, 1953 |
| 2,674,334 | Uberbacher | Apr. 6, 1954 |